(12) United States Patent
Smith et al.

(10) Patent No.: US 7,422,041 B2
(45) Date of Patent: Sep. 9, 2008

(54) TREE TRIMMING APPARATUS

(76) Inventors: George E. Smith, 19131 Red Maple Dr., Hagerstown, MD (US) 21742; John Crews, 18901 Dover Dr., Hagerstown, MD (US) 21742

( * ) Notice: Subject to any disclaimer, the term of this patent is extended or adjusted under 35 U.S.C. 154(b) by 8 days.

(21) Appl. No.: 11/017,801

(22) Filed: Dec. 22, 2004

(65) Prior Publication Data

US 2006/0130933 A1 Jun. 22, 2006

(51) Int. Cl.
*A01G 23/095* (2006.01)
(52) U.S. Cl. .................. 144/343; 144/208.2; 144/24.13
(58) Field of Classification Search ... 144/208.1–208.3, 144/24.13, 343; 47/1.01 R
See application file for complete search history.

(56) References Cited

U.S. PATENT DOCUMENTS

| | | | |
|---|---|---|---|
| 2,612,724 A | 10/1952 | Llewellyn | |
| 2,727,335 A * | 12/1955 | Susil | 47/1.01 R |
| 3,117,401 A * | 1/1964 | Talley | 451/415 |
| 3,356,113 A | 12/1967 | Del Perugia | |
| 3,457,973 A * | 7/1969 | Meier | 144/24.13 |
| 3,612,117 A | 10/1971 | Kjell | |
| 3,690,351 A | 9/1972 | Strickland et al. | |
| 3,708,000 A | 1/1973 | Duffty et al. | |
| 3,720,246 A | 3/1973 | David | |
| 3,870,123 A | 3/1975 | Izumi | |
| 4,050,485 A | 9/1977 | Valo | |
| 4,773,455 A | 9/1988 | Lessard | |
| 4,793,439 A | 12/1988 | Crawford | |
| 5,056,258 A | 10/1991 | Quinn | |
| 5,301,459 A * | 4/1994 | Eliachar et al. | 47/1.43 |
| 5,366,521 A | 11/1994 | Wootton | |
| 5,438,793 A * | 8/1995 | Eliachar et al. | 47/1.43 |
| 6,474,377 B1 | 11/2002 | Van De Mortel | |
| 6,672,346 B1 | 1/2004 | Heckmaier | |

\* cited by examiner

*Primary Examiner*—Shelley Self
(74) *Attorney, Agent, or Firm*—Hunton & Williams, LLP

(57) ABSTRACT

"A tree trimming device that automatically climbs a tree or other vertical member and shears limbs or debris as it climbs has an anchor structure with substantially horizontal clamps, a cutting assembly with substantially horizontal clamps, vertical connecting pistons, and a cutting blade assembly."

21 Claims, 19 Drawing Sheets

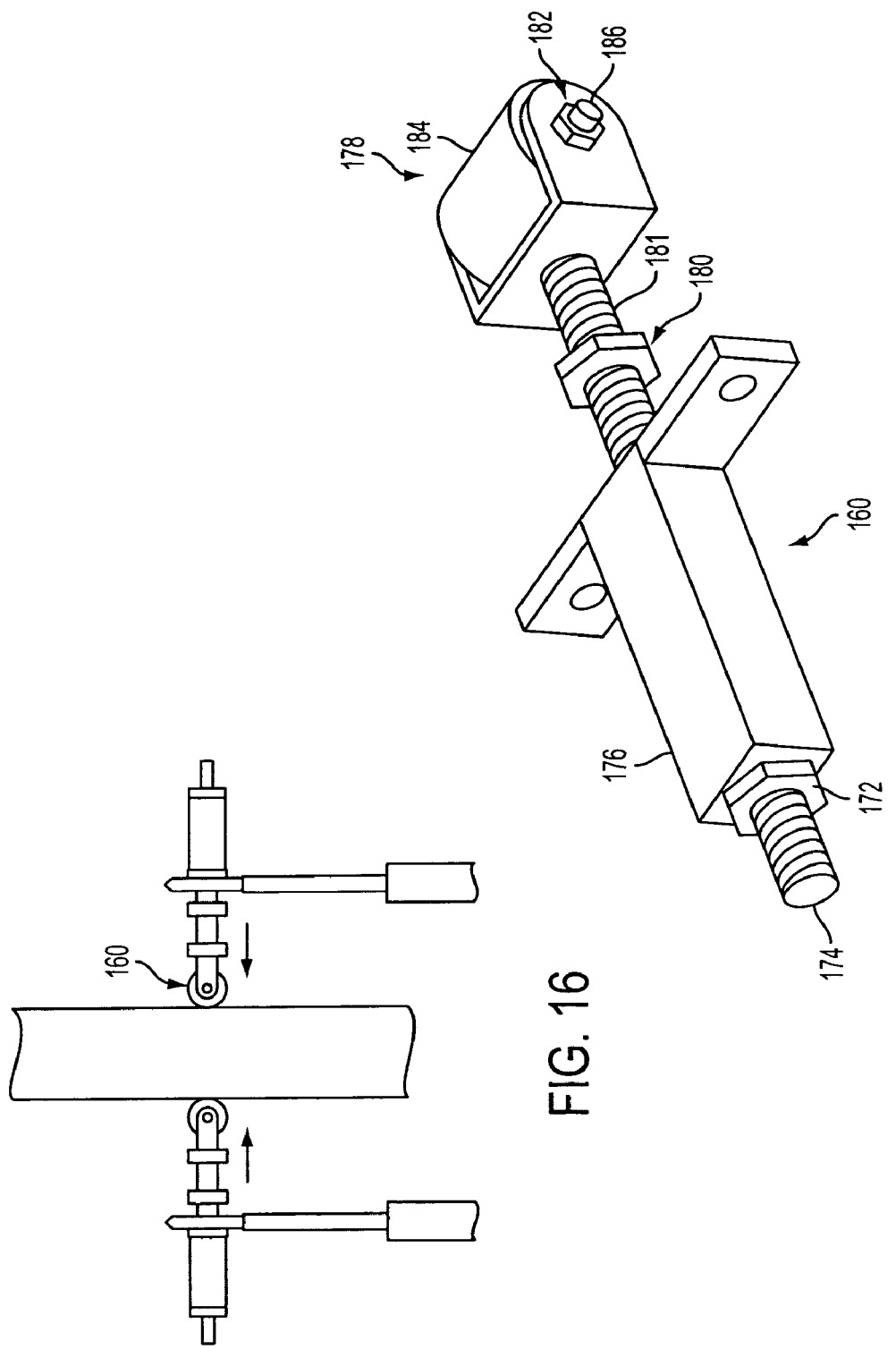

TREE TRIMMING APPARATUS

FIELD OF THE INVENTION

The present invention relates generally to the field of tree trimming, and specifically relates to an apparatus that climbs trees and trims fronds or branches.

BACKGROUND OF THE INVENTION

Many systems exist for trimming trees. Such systems typically involve the use of bucket trucks, saws on extendable poles, or systems that trim trees with rotating saw blades. Existing tree trimming systems typically cut limbs and fronds using well-known sawing techniques. Such techniques require rotating parts subject to breakdown.

Other drawbacks and disadvantages exist for existing tree trimming systems.

SUMMARY OF THE INVENTION

According to one embodiment of the present invention, a palm tree frond trimming system is provided that comprises an anchor structure comprising a plurality of clamping mechanisms to clamp onto a tree, a cutting assembly comprising a plurality of clamping mechanisms to clamp onto a tree and at least one sharpened cutting blade disposed to shear limbs from a tree; and at least one extendable piston connected to the anchor structure and the cutting assembly that may operate to change the distance between the anchor structure and the cutting assembly.

In various embodiments, the anchor structure may comprise two or more pieces connected by removable pins and/or hinges such that the rings can swivel open, be placed around the circumference of a tree, closed and secured together. The anchor structure may be clamped to the tree by a mechanical mechanism. According to one embodiment of the invention, clamping may be achieved by using a second set of extendable pistons that push horizontally against the tree. Other mechanical devices or structures that decrease the circumference of the structure/assembly such that it makes contact with and grips the tree (with a principle of operation similar to well-know hose clamps) may also be used. Once the anchor structure is clamped to the tree, the vertical connecting pistons may be extended, forcing the cutting assembly to move vertically up the trunk of the tree. Sharp cutting blades may be attached to the cutting assembly, and as the cutting assembly moves up the tree, may trim fronds or branches in its path by shearing them off. Once the vertical connecting pistons have been extended, the cutting assembly may be clamped to the tree by a mechanical mechanism similar or identical to the mechanical clamping mechanism described above for the cutting assembly. Once the cutting assembly is clamped to the tree, anchor structure may be released. The vertical connecting pistons may then be retracted, pulling the anchor structure upwards towards the cutting assembly. The anchor structure may again be clamped to the tree; the cutting assembly clamp may be released; and the process may be repeated until the apparatus has trimmed all desired fronds from the tree. The process may be reversed to safely lower the apparatus back to the base of the tree. In essence, the apparatus "walks" up the tree, trimming the palm fronds along the way, and then "walks" down the tree.

In another embodiment, the anchor structure may be disposed above the cutting assembly with the cutting blades disposed in between. Thus, the cutting occurs when the pistons are pulling the anchor structure and cutting assembly together. Such an arrangement may be used when trimming short protrusions from the vertical member, for example.

In various embodiments of the invention, hydraulics may be used. Accordingly, a safety switch on the hydraulic control system may be provided to limit and ideally prevent the clamping mechanisms of both the cutting assembly and the anchor structure from being released concurrently. This ensures that at least one of the anchor structure or cutting assembly is clamped to the tree at all times to prevent the apparatus from falling from the tree. Check valves may be used on each hydraulic line to prevent the hydraulic pressure controlling the clamping mechanism from slowly decreasing. While one embodiment uses hydraulics, the apparatus may also employ other forms of power including, but not limited to, electric or pneumatic power.

One advantageous use of this apparatus involves the trimming of palm fronds. Although an example of trimming palm fronds is described throughout this specification, it should be appreciated that the embodiments of the invention are not limited to trimming palm fronds and this same apparatus may be used for trimming limbs or other matter from virtually any physical object that it can be attached to including, but not limited to, trees, poles, or any other vertical member.

This apparatus provides numerous advantages, including: the anchoring mechanism may be provided so that it does not puncture or otherwise damage the bark of the tree; the cutting devices shear the branches or fronds from the tree, thus avoiding use of sawing which tends to break down, and, the cutting devices may be spring loaded such that they maintain a given separation from the trunk of the tree, even as the diameter of the tree changes from one given point to another.

Other advantages will be appreciated by one of ordinary skill in the art upon review of the entirety of this patent application.

BRIEF DESCRIPTION OF THE DRAWINGS

FIG. 16 depicts a partial view of a tree trimming apparatus 10 with a roller assembly according to an embodiment of the present invention.

FIG. 17 depicts an exploded view of a roller assembly according to an embodiment of the present invention.

DETAILED DESCRIPTION OF EMBODIMENTS

Figure 1A:
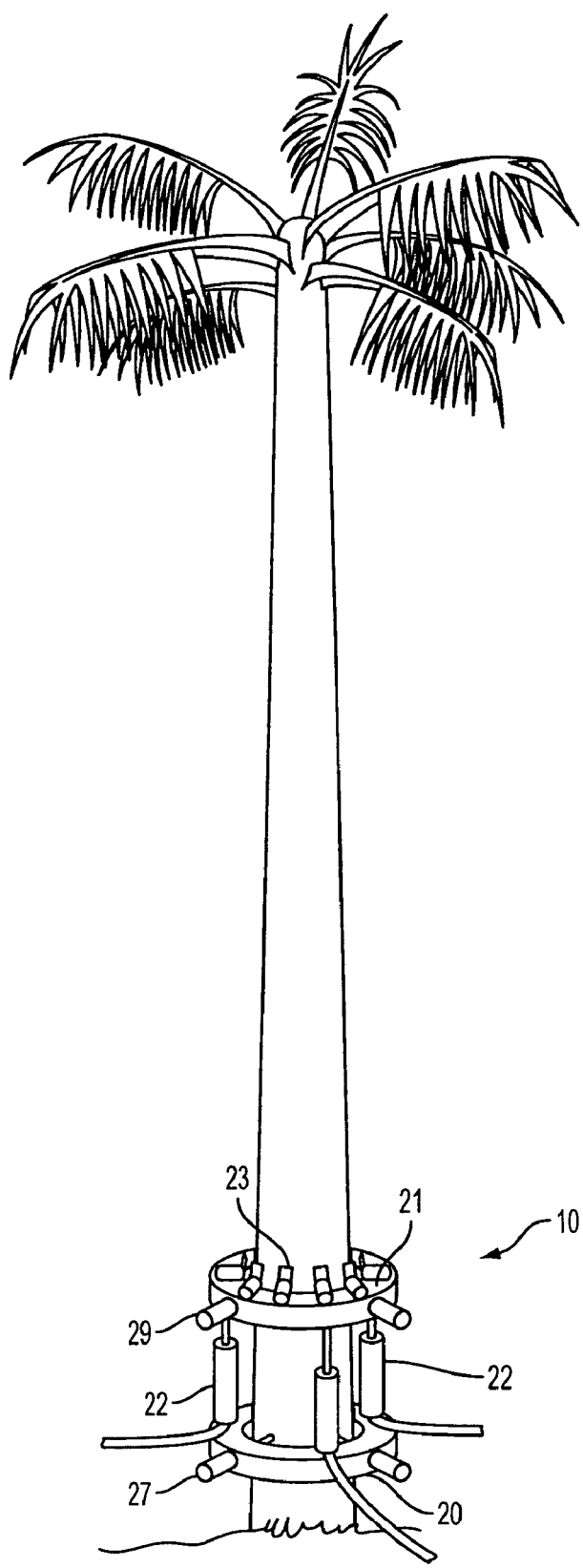
FIGS. 1(a)-1(c) depict an apparatus according to one embodiment of the present invention in various stages of a frond cutting operation.
Figure 1B:
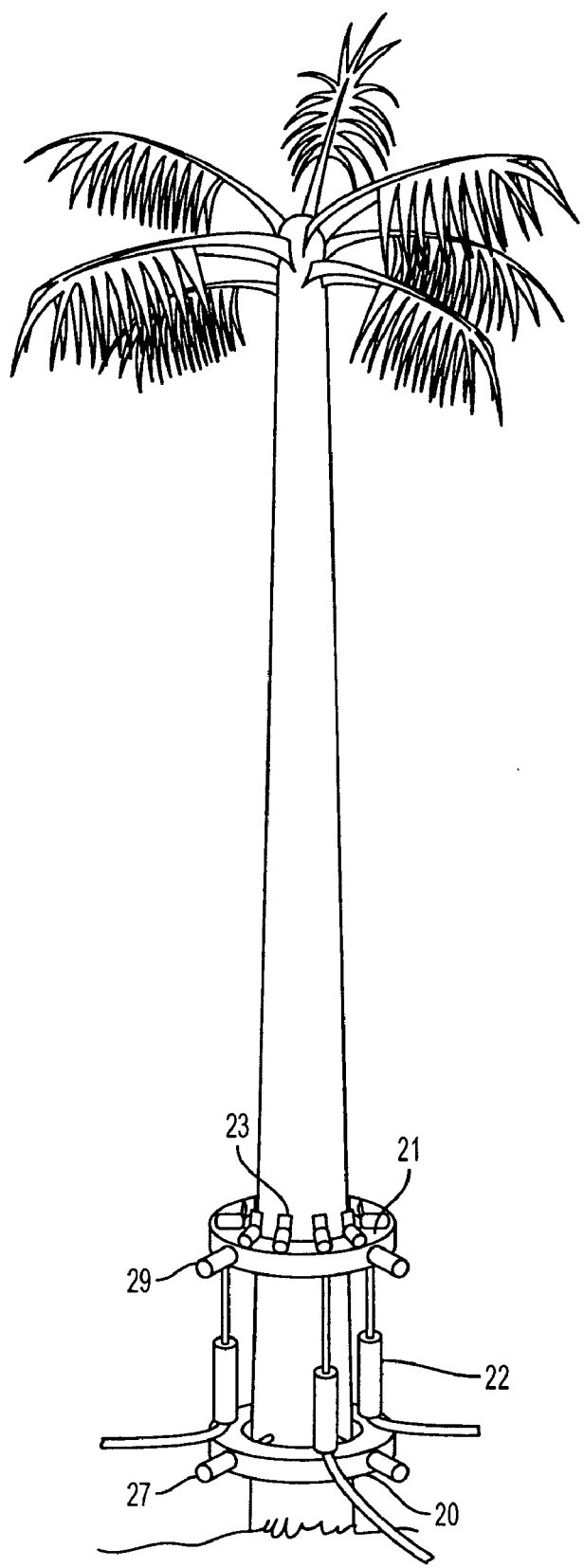
Figure 1C:
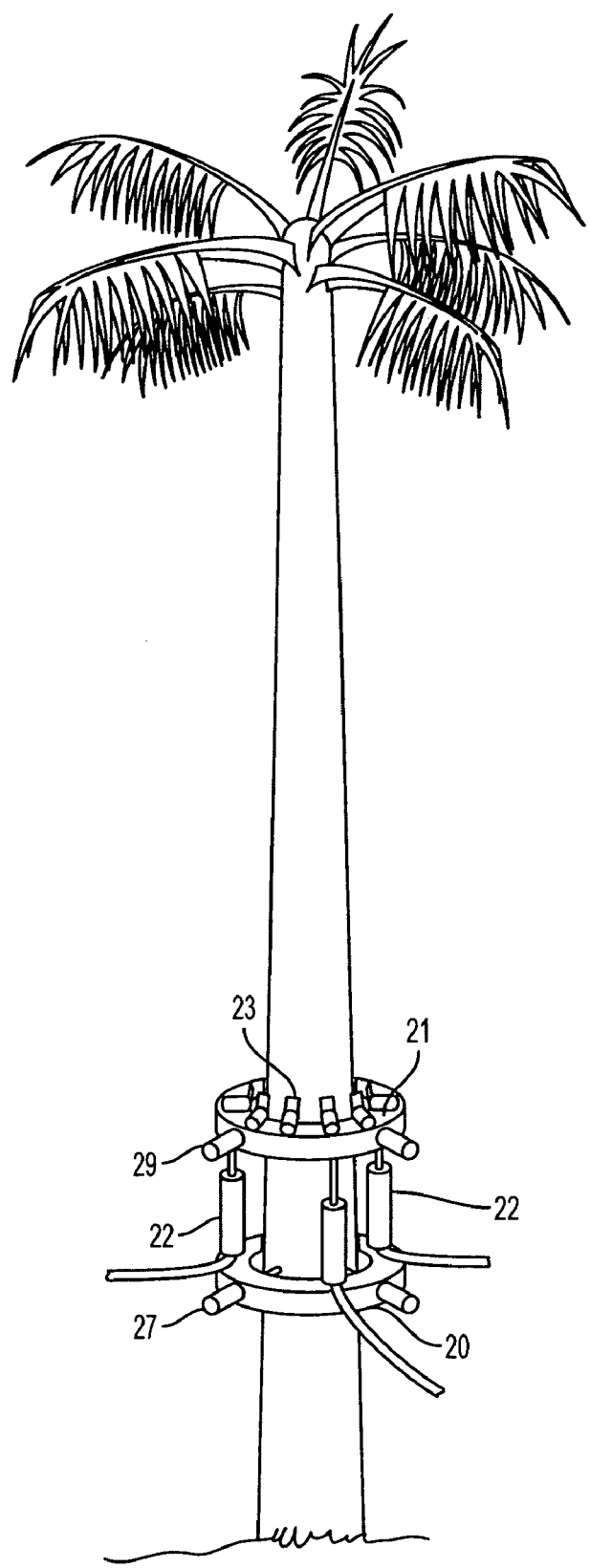

As discussed above, various embodiments and iterations of the present invention relate to a tree trimming apparatus as depicted in the figures and described herein. The tree trimming apparatus 10 may comprise an anchor assembly 20 secured to a cutting assembly 21 by one or more extendable pistons 22. In addition, a plurality of cutting blade assemblies 60 may be secured to the cutting assembly 21. The cutting blades 61 may be secured to the cutting assembly 21 such as through a pivot point 62 and a spring clip mechanism 65 to keep the cutting blades a given distance from the trunk of the tree.

In one embodiment, the anchor assembly 20 may be made of aluminum, and may be divided into a plurality of pieces (e.g., two or more), attached by a hinge at one or more points, and secured by a removable pin 26 at one or more other points. Each joint may also be secured by two or more pins. The pin 26 can be removed to pivot anchor assembly 20 open and wrap it around the circumference of a tree. Once anchor assembly 20 is in place around a tree, the pin 26 can be replaced to secure anchor assembly 20 around the tree. One or more horizontal, extendable pistons 27 (e.g., three pistons) may be spaced around, and attached to, the cutting assembly (e.g., equally spaced). While the embodiment shown uses three extendable pistons, any number of such pistons may be used. When extended, these horizontally mounted pistons 27 may make contact with the trunk of the tree, and anchor the anchor assembly 20 to the tree. Similarly, horizontally-mounted pistons 29 may be used to clamp the upper cutting assembly to the tree while the vertical pistons 22 are being retracted during normal operation.

Figure 2:
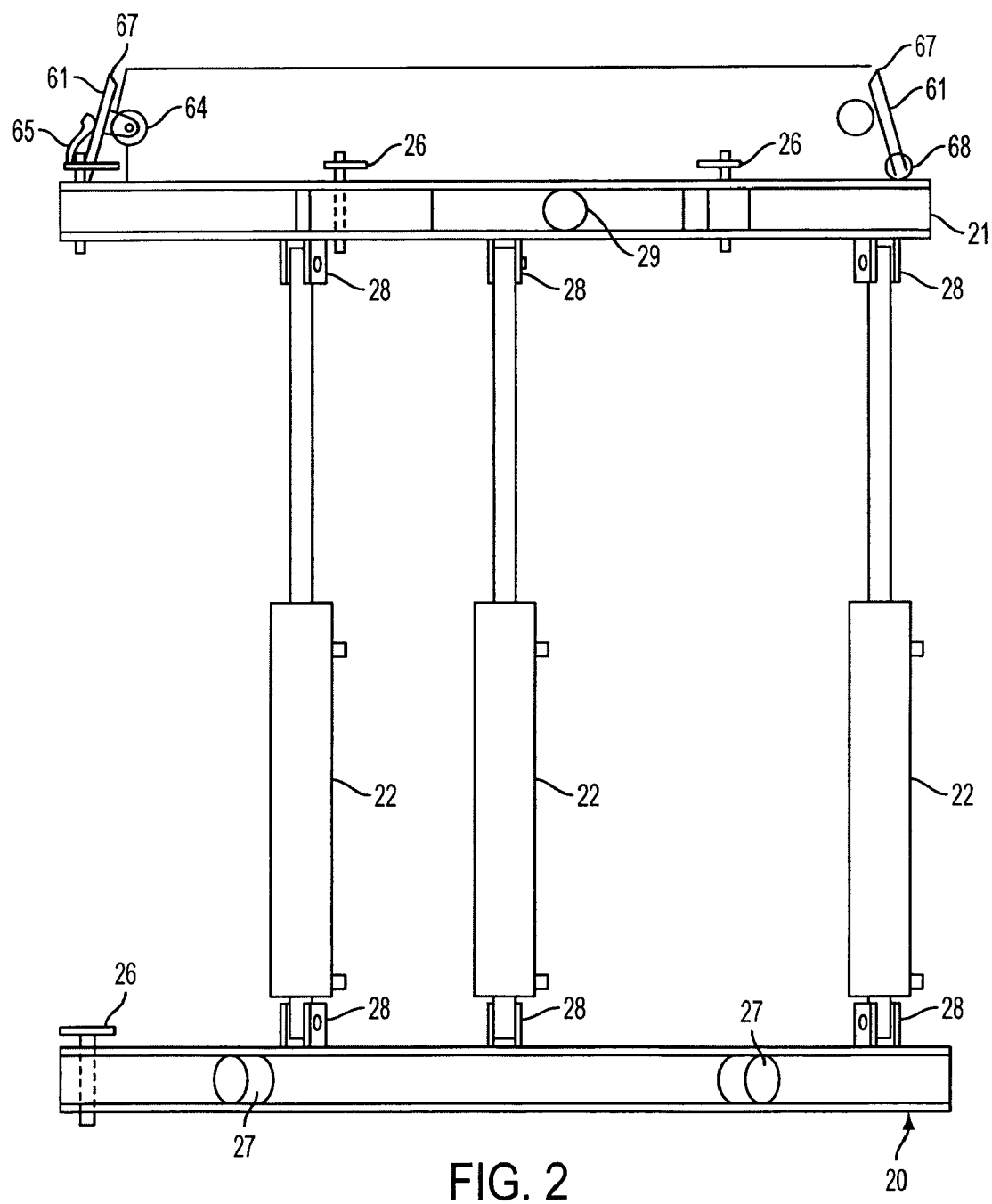
FIG. 2 depicts a side view of the apparatus with vertical connecting pistons partially extended according to one embodiment of the present invention.

As shown in FIG. 2, anchor assembly 20 may be connected to cutting assembly 21 by three extendable pistons 22, although any number of such pistons may be used.

Extendable pistons are well known in the art. According to one embodiment, hydraulic pistons may be used because of their smaller size, higher operating pressure, and minimal expense. Other types of pistons, including, but not limited to, pneumatic and electric powered pistons, may also be used.

Figure 3A:
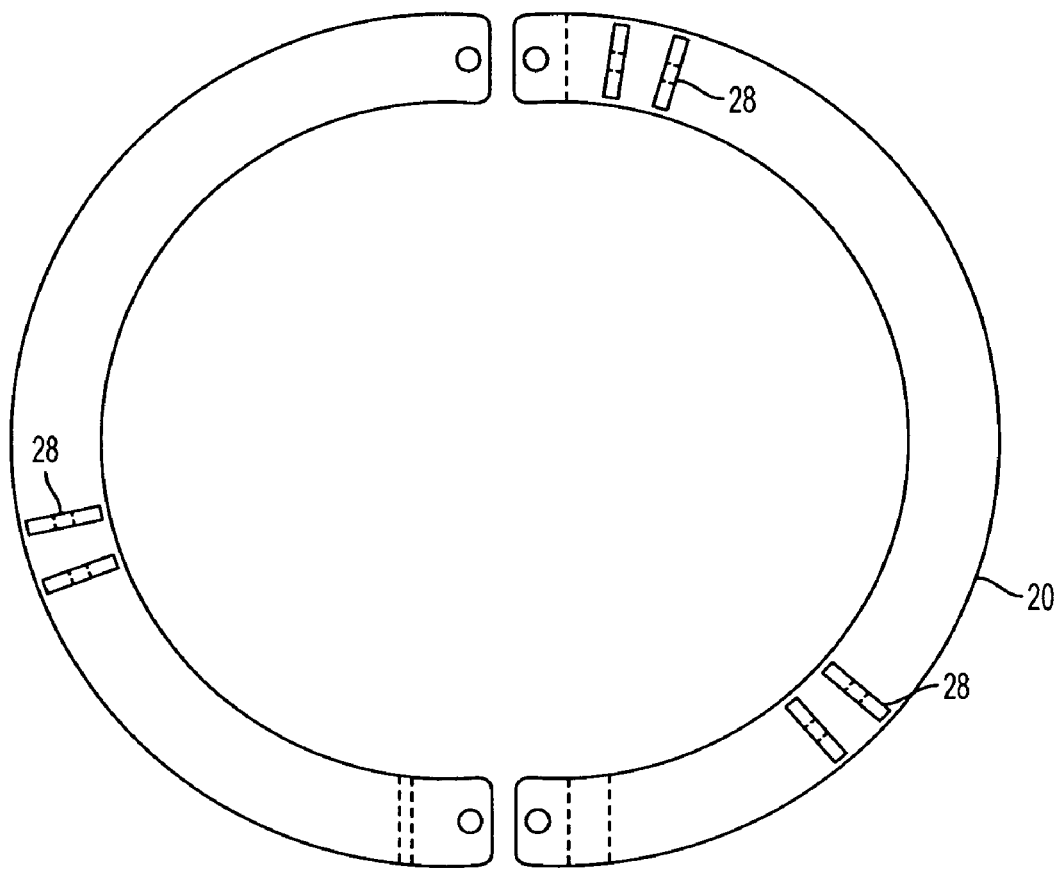
FIG. 3(a) depicts an exploded top view of an cutting assembly detailing two joints that are secured together with removable pins according to one embodiment of the present invention.
Figure 3B:
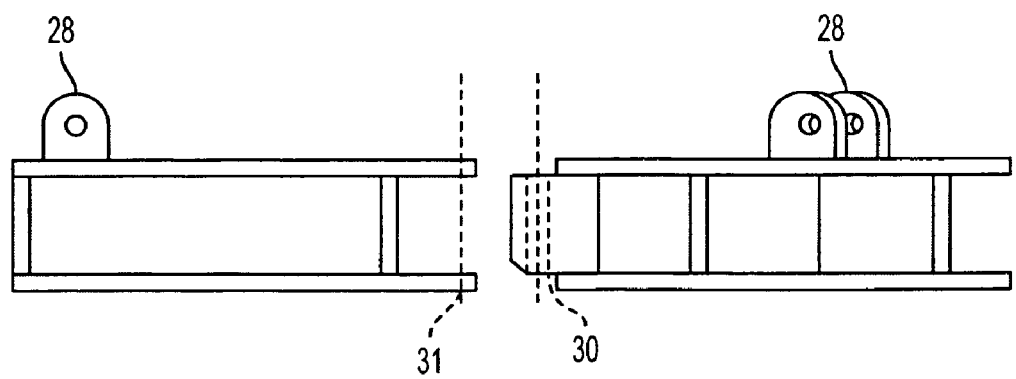
FIG. 3(b) depicts a side view of an cutting assembly according to one embodiment of the present invention.

One end of the vertical connecting pistons 22 may be attached to the cutting assembly 20, and the other end may be attached to the cutting assembly 21, forming a cylindrically shaped apparatus. As shown in FIG. 3, the attachment point may be a bracket 28 welded to the anchor or cutting assembly, with a pin securing the piston to the bracket. The cutting assembly 21 may be made of aluminum, and may comprise two or more links. In one embodiment, each link has either two male ends or two female ends. Also, each link could have one male end, and one female end. As detailed in FIG. 3, the male end of one link 30 may be attached to the female end of a second link 31 via a removable pin, such that assembly 20/assembly 21 may be opened to place them around a tree, and then secured closed with a pin. By using a series of removable links, the diameter of the upper cutting assembly can be adapted to fit around various size tree trunks.

Although FIG. 3. depicts one embodiment of removably connecting the links of the cutting assembly and the cutting assembly assemblies as one example of a mechanism for enabling the apparatus to be adjustable for various tree sizes, it should be understood that other mechanism may also be used within the scope of this invention.

Figure 4A:
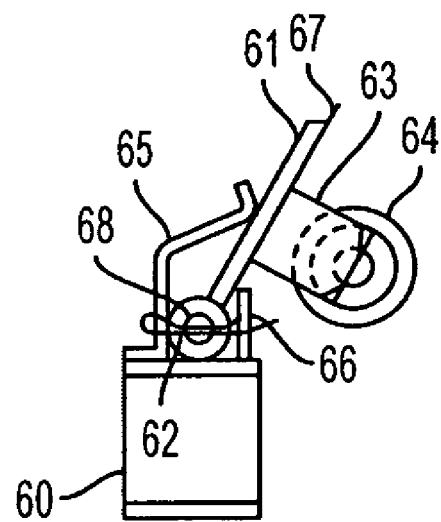
FIG. 4(a) depicts a side view of a cutting blade assembly attached to a cutting assembly according to one embodiment of the present invention.
Figure 4B:
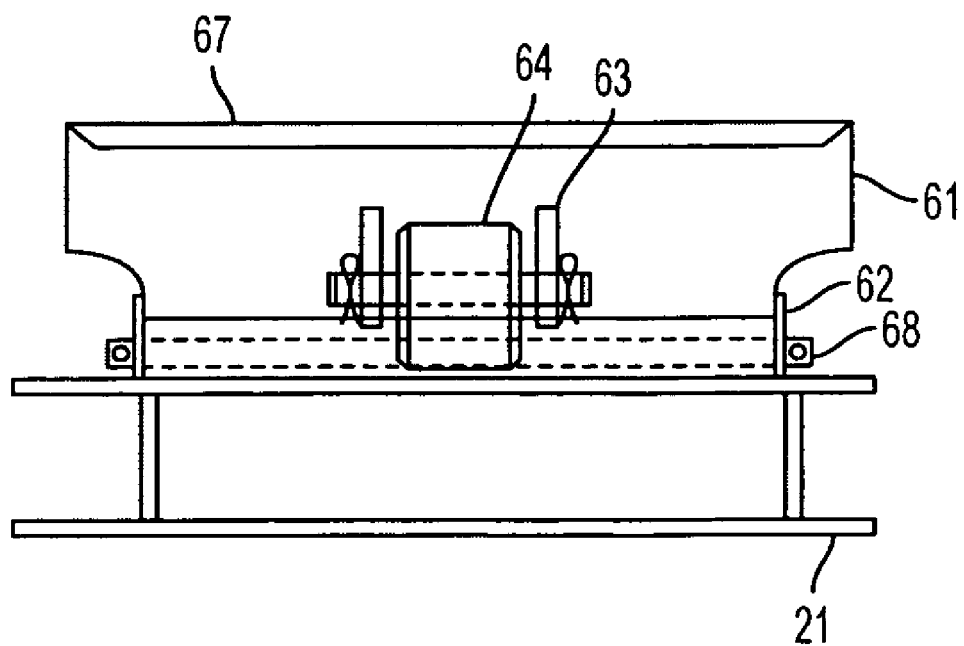
FIG. 4(b) depicts a back view of a cutting blade assembly according to an embodiment of the present invention.

As shown in FIG. 4, at least one cutting blade assembly 60 may be attached around the cutting assembly. In one embodiment, cutting blade assembly 60 may comprise a steel cutting blade 61, a steel tube 62, a wheel support 63, a wheel 64, a spring clip 65, and a stopper block 66. The steel cutting blade may be sharpened on at least one edge 67, and may have at least one unsharpened edge attached (welded, or otherwise) to a cylindrical steel tube 62. Each cutting blade 61 may be attached to a cutting assembly link via a rod 68 that passes through the attached steel tube 62, forming a hinge (pivot point). A wheel support 63 may be welded or otherwise secured to the planar side of the cutting blade 61 that is closest to the inside of the cutting assembly 21 (the tree side). A wheel 64 may be attached to the wheel support 63 such that the wheel rolls along the trunk of the tree, keeping the cutting blade 61 a fixed distance range from the bark of the tree trunk. A spring clip 65 may be attached to the outside edge of the cutting assembly such that the spring pushes on the second planar side of the cutting blade (opposite the wheel). The spring may be disposed to bias the wheel against the tree trunk, which in turn keeps the cutting blade a fixed distance range from the bark of the tree trunk. Opposite the spring, a stopper block 66 may be disposed in such a way to prevent the spring from pushing the blade completely into a horizontal orientation. During normal operation, the cutting edge of the blade meets palm fronds or tree branches at a slight angle for easier cutting. The force created by the vertical connecting pistons causes the cutting blades to shear off any fronds or limbs that they come in contact with.

In one embodiment, the cutting blade assemblies may be disposed around the cutting assembly to cover substantially all of the periphery of a tree trunk in operation. This may be achieved by aligning the cutting blade assemblies so that the blades on adjacent cutting blade assemblies are substantially close.

Although FIG. 4 depicts one embodiment of the cutting assembly in greater detail as one example of a mechanism for enabling the cutting blade to shear branches from a tree at a fixed distance, it should be understood that other mechanism may also be used within the scope of this invention.

Figure 5:
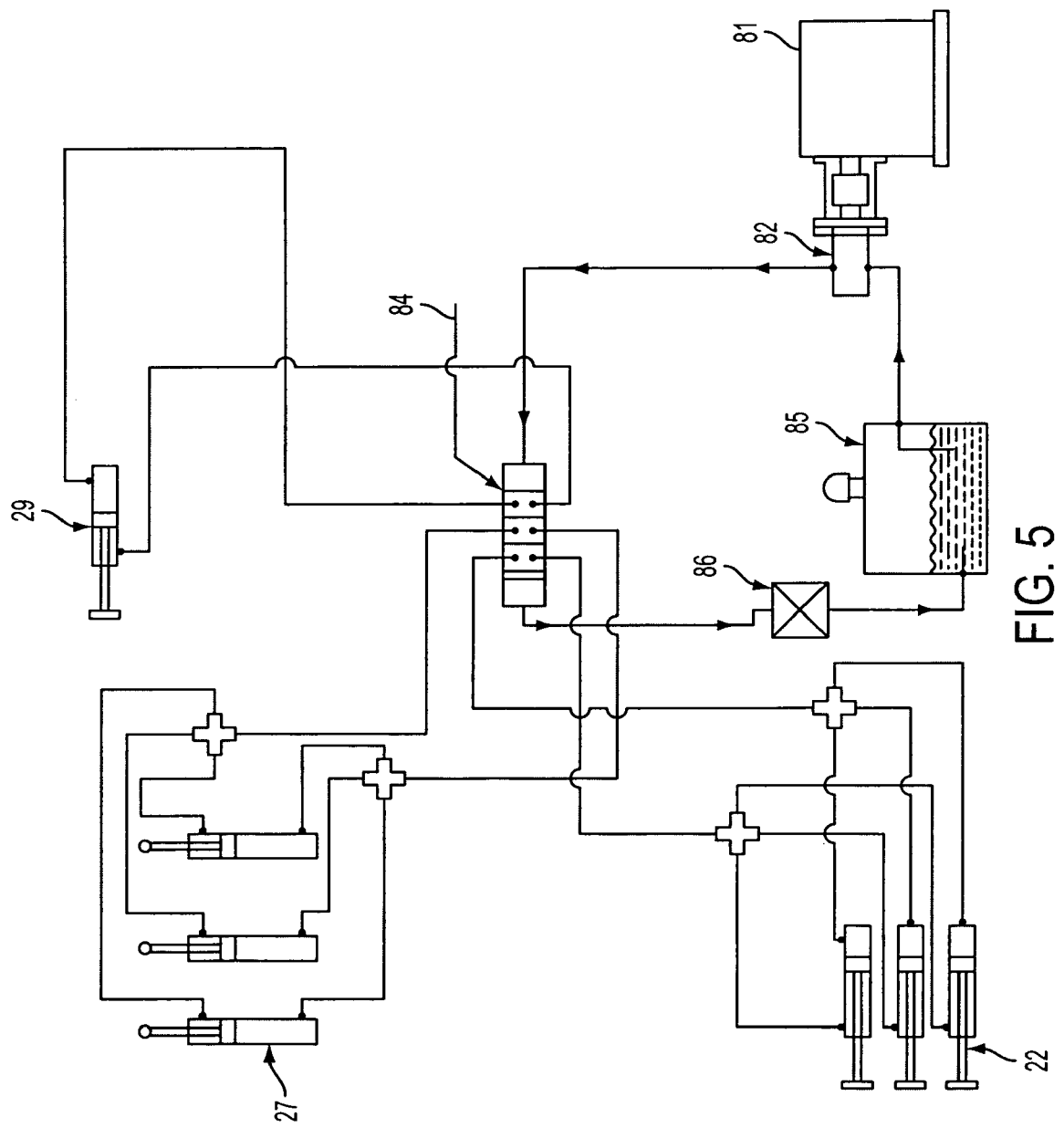
FIG. 5 depicts one embodiment of the hydraulic control system, including an engine that drives a hydraulic pump, hydraulic hoses, a control valve, check valves, and flow dividers.

FIG. 5 depicts one embodiment of a hydraulic control system for operating a tree trimming apparatus. In this embodiment, a portable engine 81, such as an 8 horsepower gasoline generator, supplies power to a hydraulic pump 82. A plurality of hydraulic hoses 83 may connect the hydraulic pump 82 to a hydraulic fluid reservoir 85, a hydraulic fluid filter 86, the one or more cutting assembly clamping pistons 27, the one or more cutting assembly clamping pistons 29, and the one or more vertical extending pistons 22 via a control valve 84. The control valve 84 may have three sections: one controls the cutting assembly clamping piston(s) 27; one controls the cutting assembly clamping piston(s) 29; and one controls the vertical extending piston(s) 22.

The control valve 84 allows the system operator to control the hydraulic pressure delivered to the various hydraulic pistons, which in turn may control the amount of force being exerted by the clamping pistons and the vertical extending pistons. The system operator may use the control valve to first extend the cutting assembly clamping piston(s) 27, then extend the vertical piston(s) 22, forcing the cutting assembly up the tree. Once the vertical pistons are extended to the desired distance or fully extended, the operator may extend the cutting assembly clamping piston(s) 29, and retract the cutting assembly clamping piston(s) 27. Then the vertical pistons 22 can be fully retracted, pulling the cutting assembly 20 up the tree towards the cutting assembly 21. The process is repeated to "walk" the apparatus up the tree, and shear branches from the tree as it climbs. The process is reversed to lower the apparatus back to the ground.

The control valve 84 includes a safety mechanism that may prevent both the cutting assembly clamping pistons 27 and cutting assembly clamping pistons 29 from being retracted at the same time. If both sets of pistons are retracted concurrently while the apparatus is at an elevated position on the tree, the apparatus may fall, potentially causing personal injury and/or damage to the apparatus. The safety mechanism may be used to prevent such an occurrence.

Figure 8:
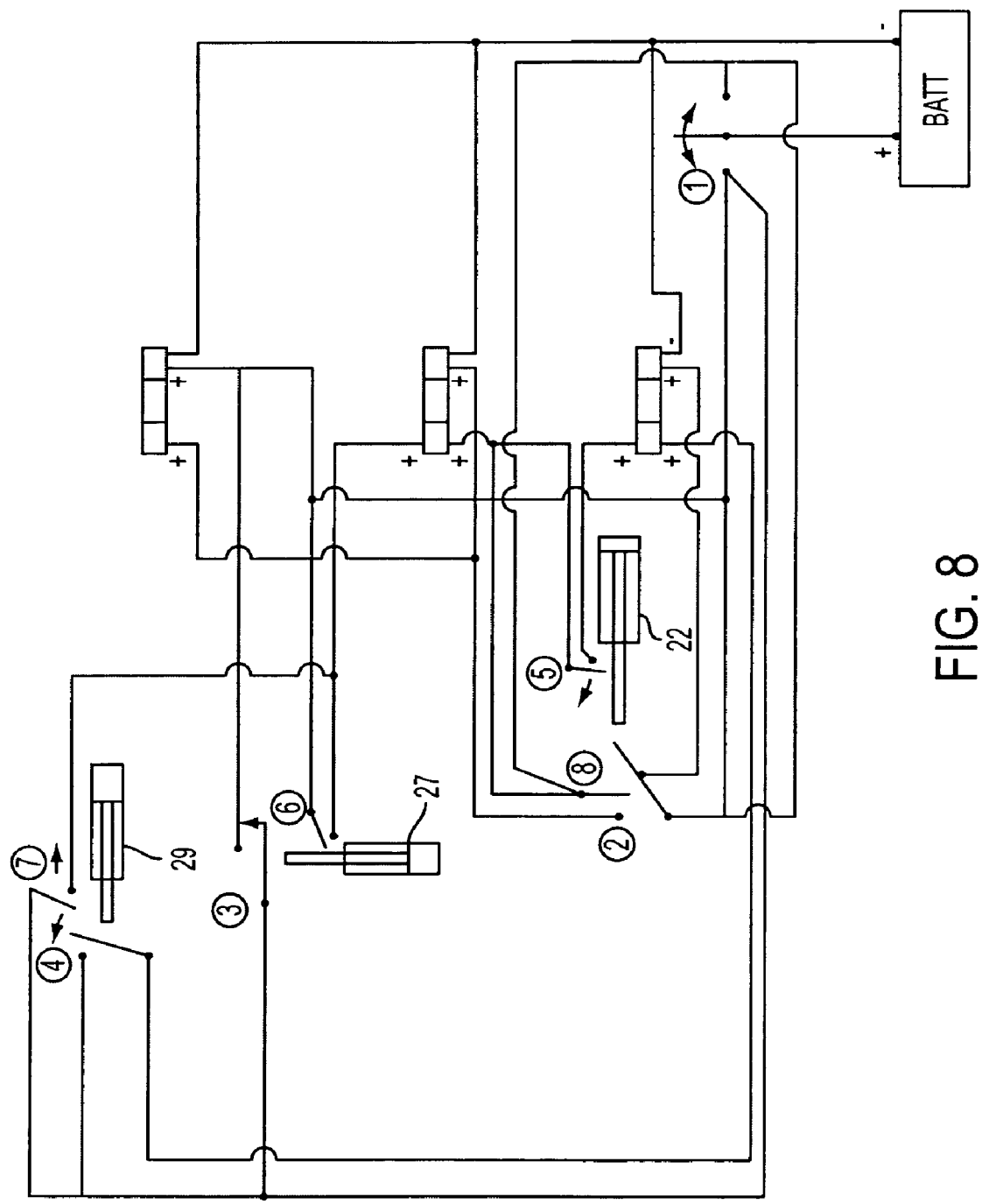
FIG. 8 depicts a schematic depicting the arrangement of switches to control operation of a frond cutting apparatus according to another embodiment of the present invention.

FIG. 8 depicts a schematic displaying a number of switches that may be employed. The switches have been numbered from 1 to 8 for convenience in explanation. According to one embodiment, to climb up a tree or other structure, switch 1 is manually moved, under control of a user, to direct+to extend the lower clamp cylinder 22. Switch 2 may then be moved by the extended cutter cylinder 29. Switch 3 may then be moved by the extended cutter cylinder 29 to direct+to extend the upper clamp cylinder 29. Switch 4 may then be moved by the upper clamp cylinder 29 to direct+to retract the lower clamp cylinder 22. When the lower clamp cylinder 22 has been retracted, it moves switch 5 to direct+to retract the cutter cylinder 27. Switch 6 may then be moved by the retracted cutter cylinder 27 to direct+to extend the lower clamp cylinder 22. Switch 2 may then be activated to direct+to extend the cutter cylinder 27 and to retract the upper clamp cylinder 29. The above cylinder may continue until the operator manually moves switch 1 back to neutral.

To move the frond cutting apparatus down a structure, such as a tree, switch 1 may extend lower clamp cylinder 22. Switch 8 may then retract cutter cylinder 27. Switch 6 may then extend upper clamp cylinder 29. Switch 4 may then retract lower clamp cylinder 22. Switch 3 may then extend lower clamp cylinder 22. Switch 2 retracts upper clamp cylinder 29 and then switch 7 retracts cutter cylinder 27. A separate switch (not shown) may be provided to retract the lower clamp cylinder such that the frond cutting apparatus may be removed from the tree or other structure.

Figure 6:
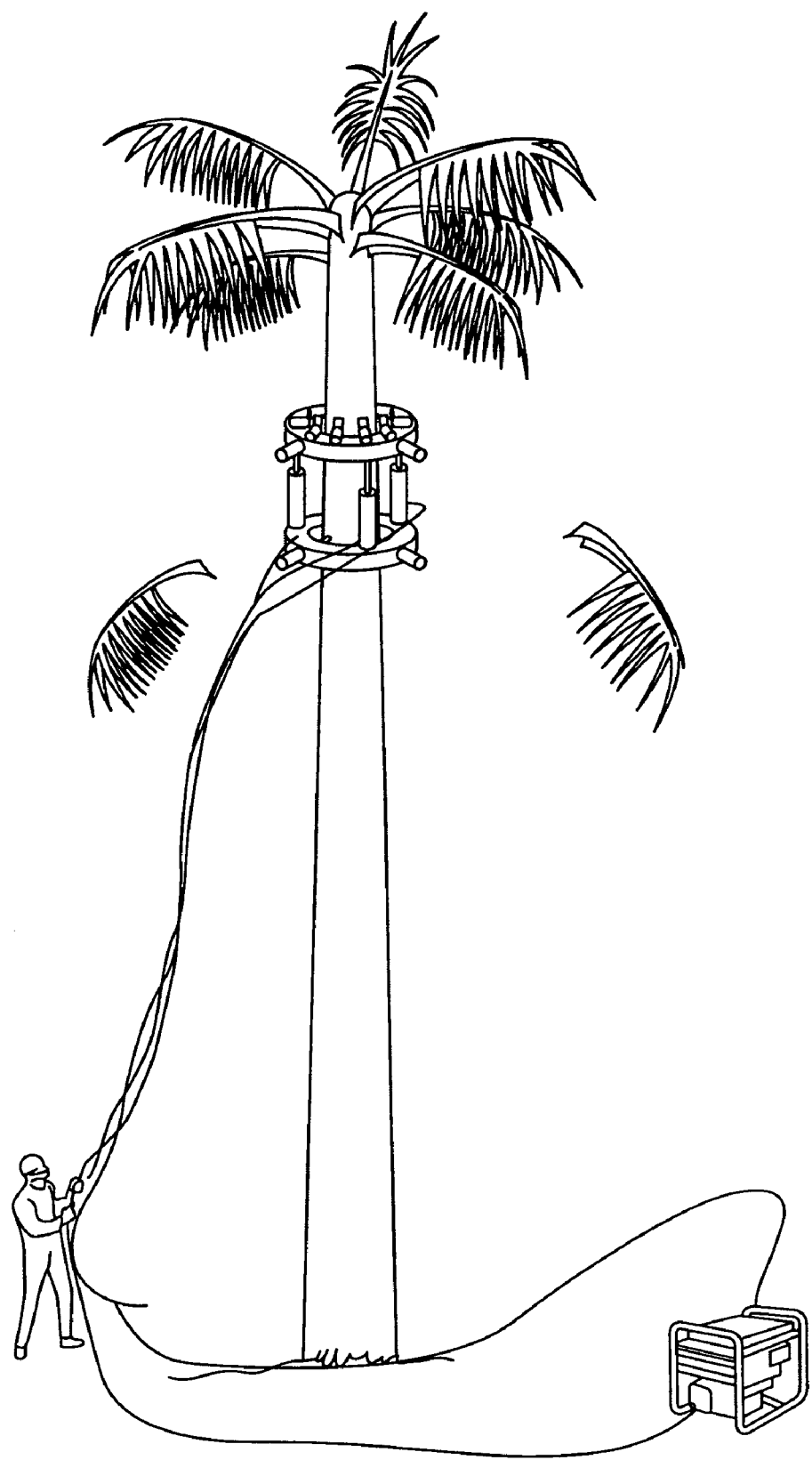
FIG. 6 depicts a tree-trimming system according to an embodiment of the present invention.

"FIG. 6 depicts an overall view depicting operating of one embodiment of the present invention with a motor/pump assembly shown. It should be appreciated that motor/pump assembly may also be provided in a movable system, such as a cart or the like, for easy movement from tree to tree and onto a larger vehicle for transportation to different sites as described below."

FIG. 6 depicts an overall view depicting operating of one embodiment of the present invention with a motor/pump assembly 100 shown. It should be appreciated that motor/pump assembly may also be provided in a movable system, such as a cart or the like, for easy movement from tree to tree and onto a larger vehicle for transportation to different sites as described below.

Figure 7A:
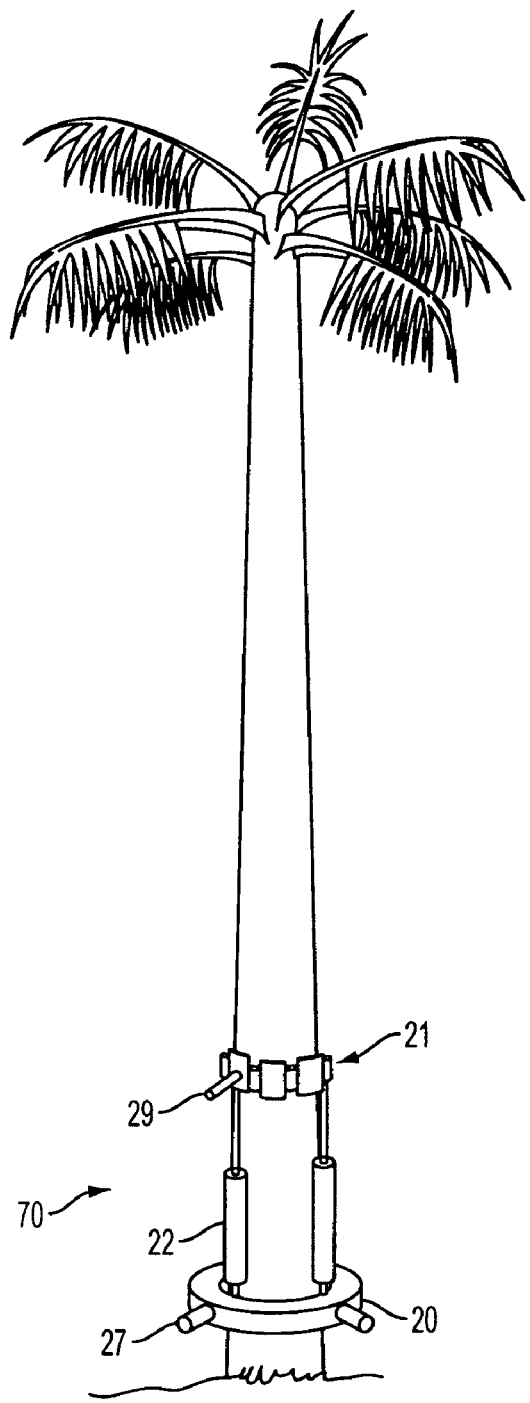
FIG. 7(a) depicts a frond cutting apparatus according to another embodiment of the present invention.
Figure 7B:
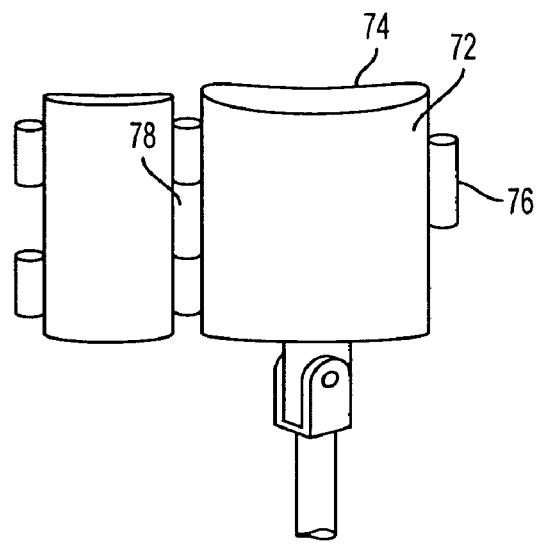
FIG. 7(b) depicts an exploded view of a link assembly for use in a frond cutting apparatus according to another embodiment of the present invention.

Another embodiment of the present invention is depicted in FIGS. 7(a) and (b). In this exemplary embodiment, a cutting assembly 70 may comprise a plurality of links 72 (as a cutting mechanism), each with a blade portion 74 (which may be integrated). Links 72 may be connected by one or more cylinder(s) 76 and pin(s) 78. Providing this arrangement reduces the number of parts of the cutting device and enables easier replacement if a blade were to break or become otherwise damaged. Other parts and mechanisms of this embodiment may be the same as described above.

In addition, it should be appreciated that blade portion 74 may be used in the embodiment of FIGS. 2, 3, 4(a) and 4(b) as well.

A number of other embodiments for blade portion 74 or element 61. These embodiments may be shown as depicted in FIGS. 9(a)-11(c).

Figure 9A:
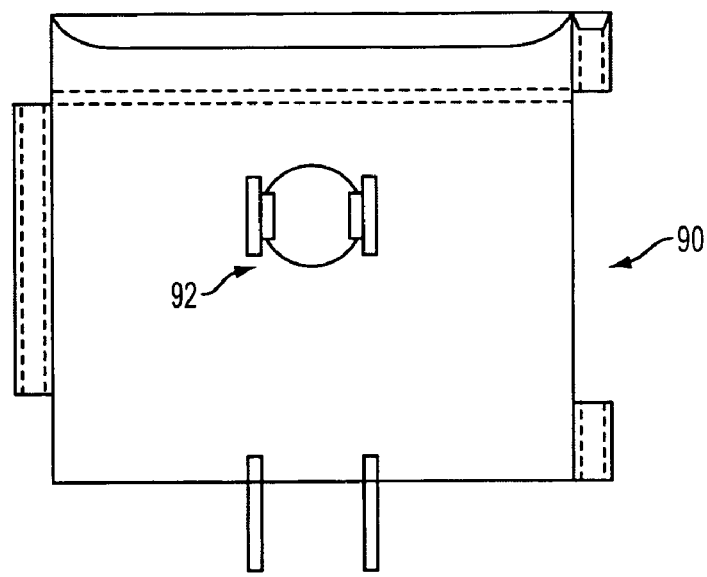
FIG. 9(a) depicts an exploded view of a blade assembly with provision for cylinder connection according to an embodiment of the present invention.
Figure 9B:
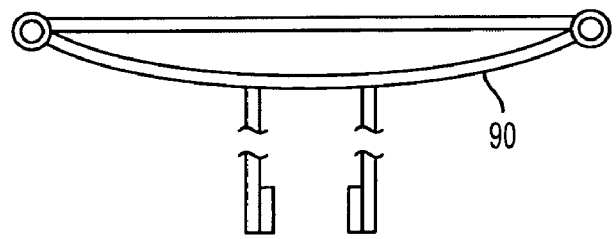
FIG. 9(b) depicts a top view of the embodiment of FIG. 9(a).
Figure 9C:
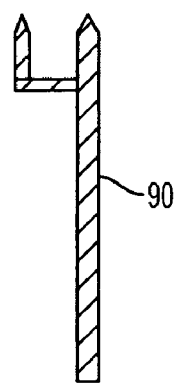
FIG. 9(c) depicts a partial side view of the embodiment of FIG. 9(a).

FIGS. 9(a)-9(c) depict various views of another embodiment of a blade assembly 90 with a mounting assembly 92 for mounting a cylinder (such as cylinders 22, 27 or 29) if it is desired to place the blade assemblies 90 on cylinders mounted to one of the anchor assembly 20 or the cutting assembly 21.

Figure 10A:
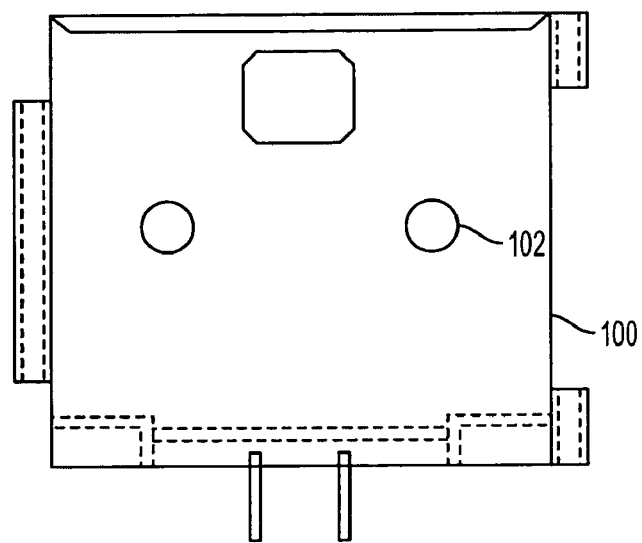
FIG. 10(a) depicts an exploded view of another embodiment of a blade assembly with provision for multiple cylinder connections and/or roller blade assembly connections according to an embodiment of the present invention.
Figure 10B:
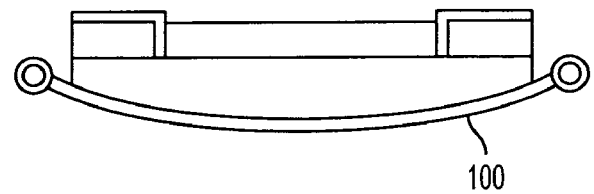
FIG. 10(b) depicts a top view of the embodiment of FIG. 10(a).
Figure 11:
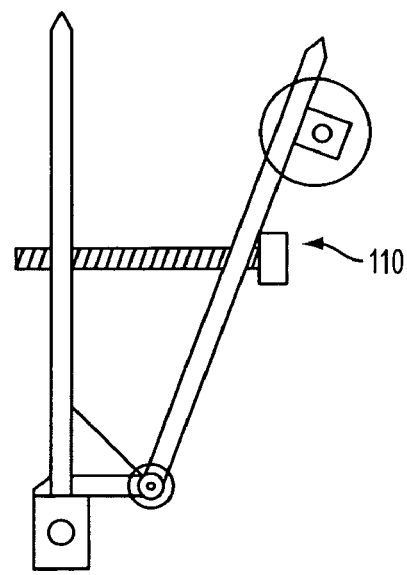
FIG. 11 depicts a side view of the embodiment of FIG. 10(a) with provision of a roller blade assembly according to an embodiment of the present invention.
Figure 12C:
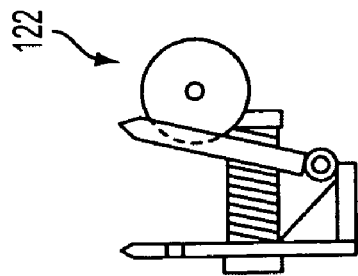
FIG. 12(c) depicts a side view of the embodiment of FIG. 12(a).
Figure 12D:
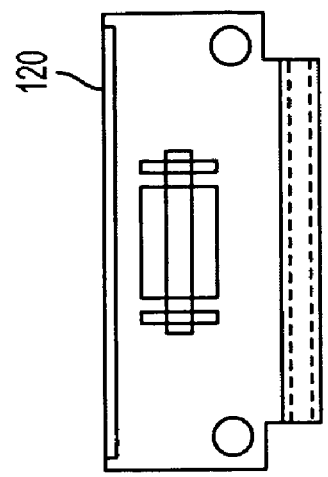
FIG. 12(d) depicts a rear view of the embodiment of FIG. 12(a).
Figure 12A:
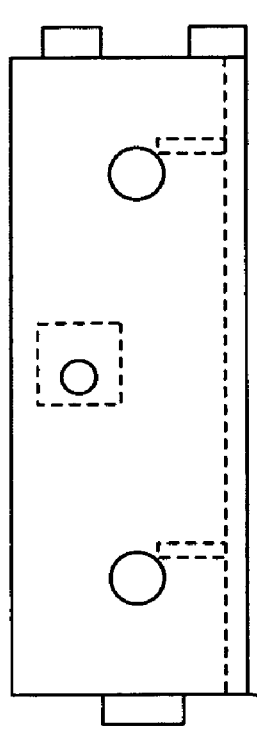
FIG. 12(a) depicts an exploded view of another embodiment of a blade assembly with provision for multiple cylinder connections and/or roller blade assembly connections according to an embodiment of the present invention.
Figure 12B:
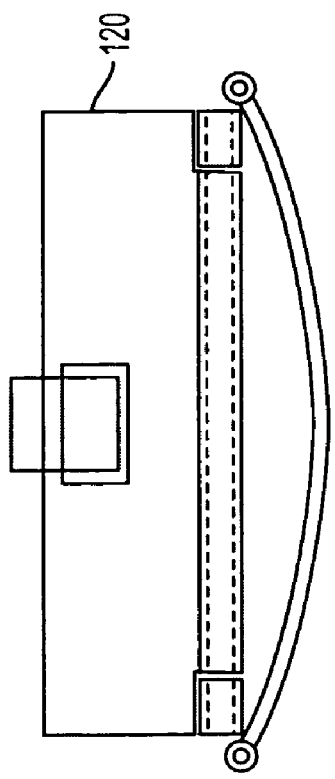
FIG. 12(b) depicts a top view of the embodiment of FIG. 12(a).

FIGS. 10(a)-(b) depict another embodiment of a blade assembly 100 with multiple mounting assemblies 102 for mounting cylinders or roller assemblies. Moreover, FIG. 11 depicts one or more spring-mounted roller assemblies 110 according to an embodiment of the present invention.

FIGS. 12(a)-12(d) depict an embodiment of a blade assembly 120 to which one or more roller assemblies 122 may be mounted. A spring-based loading mechanism may be used, as depicted.

Figure 13:
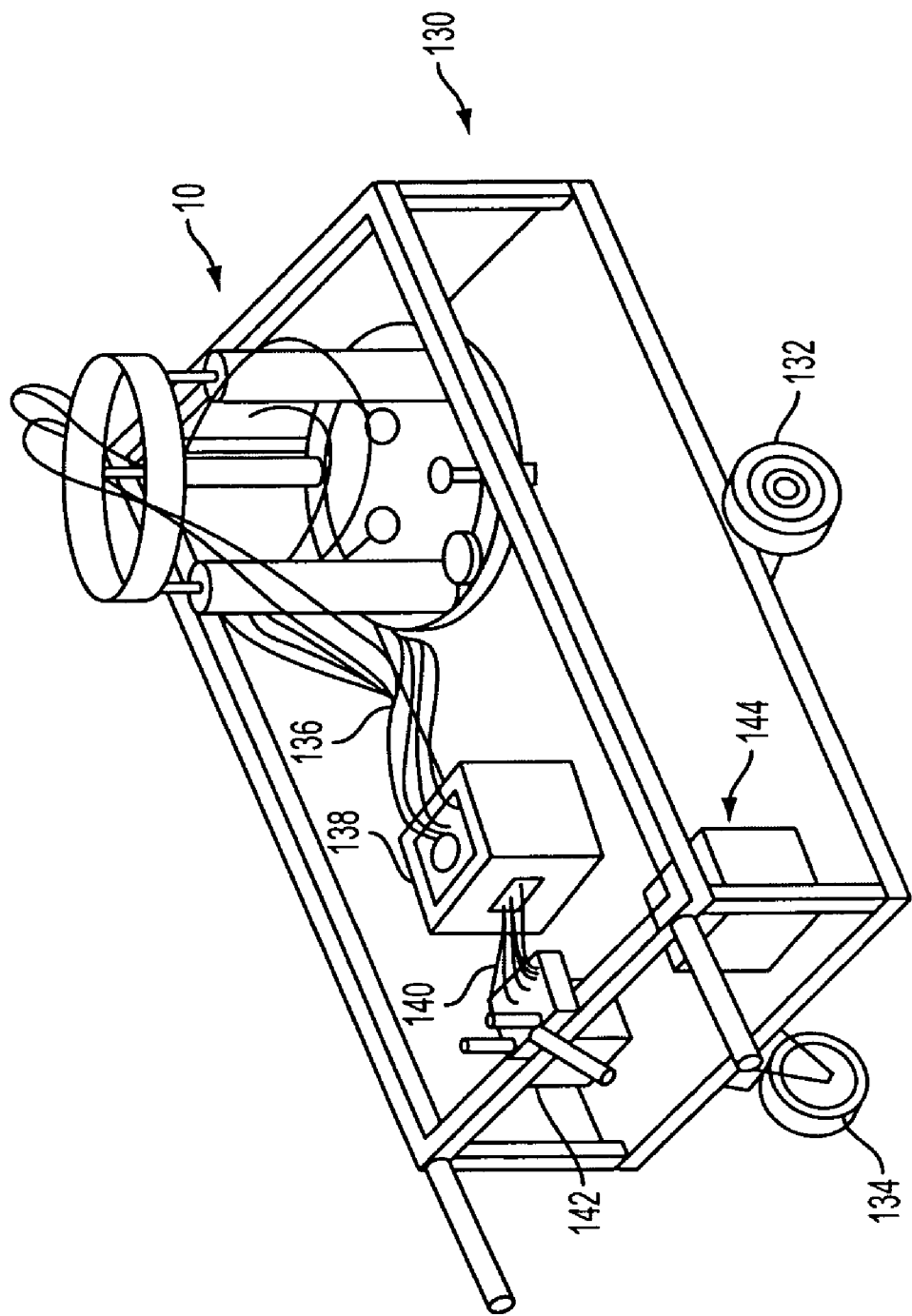
FIG. 13 depicts a partial exploded view of a transportation assembly for a frond cutting assembly according to an embodiment of the present invention.

"FIG. 13 depicts an embodiment of a transportation assembly 130 according to an embodiment of the present invention. Frond cutting assembly 10 may rest and/or connect to transportation assembly 130. In addition, a plurality of side wheels 132 may be provided. Further, one or more castors 134 may be provided. Assembly 130 may also be provided with a hitch for connection to a vehicle. Frond cutting assembly 10 may connect, via one or more cables 136 to a control assembly 138, which may connect via cables 140 to a control panel 142. A hydraulic pump assembly 144 may also be disposed on transportation assembly 130."

FIG. 13 depicts an embodiment of a transportation assembly 130 according to an embodiment of the present invention. Frond cutting assembly 10 may rest and/or connect to transportation assembly 130. In addition, a plurality of side wheels 132 may be provided. Further, one or more castors 134 may be provided. Assembly 130 may also be provided with a hitch for connection to a vehicle. Frond cutting assembly 10 may connect, via one or more cables 136 to a control assembly 138, which may connect via cables 140 to a control panel 140. A hydraulic pump assembly 144 may also be disposed on transportation assembly 130.

Figure 14:
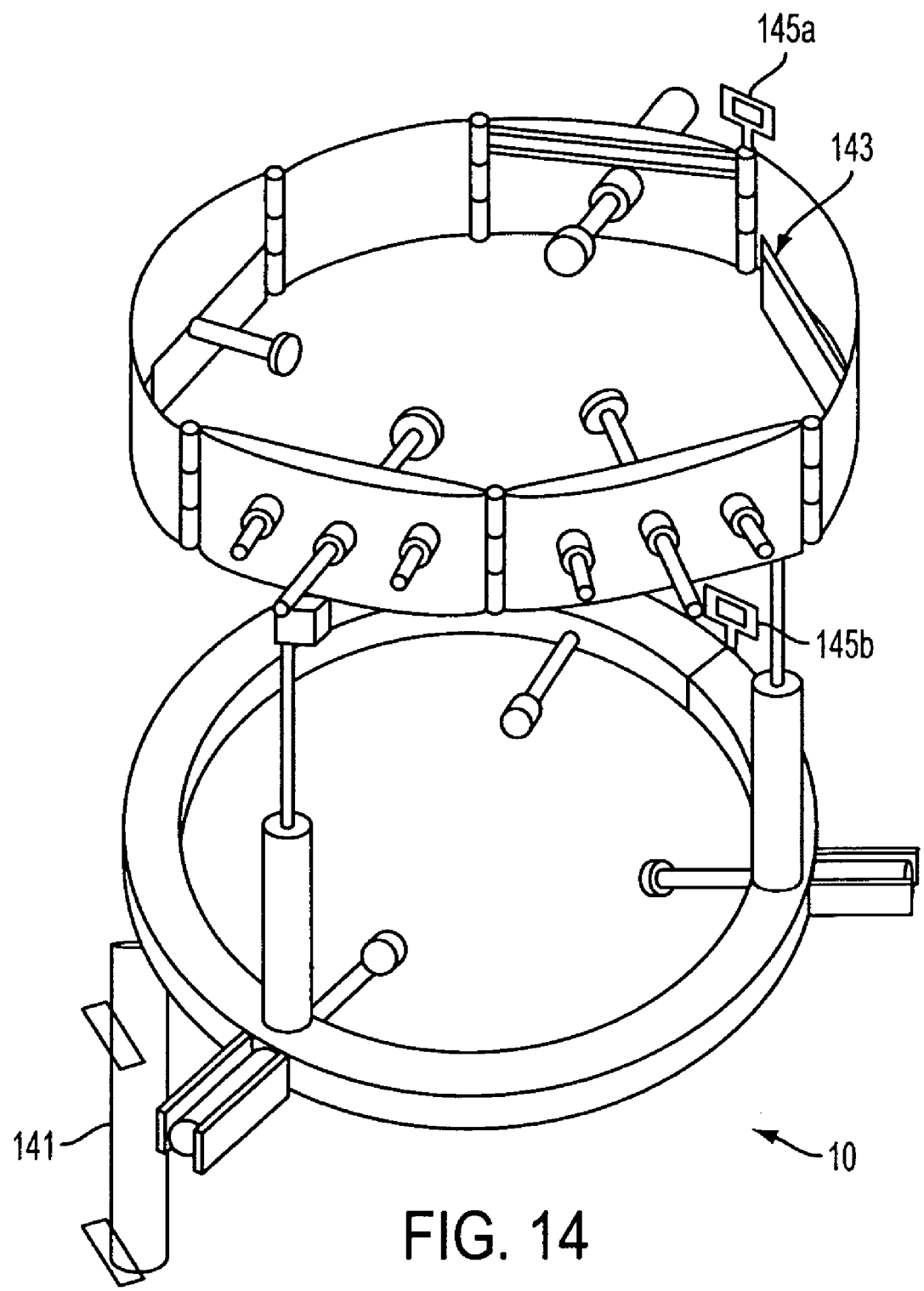
FIG. 14 depicts an embodiment of a frond cutting assembly having a transportation assembly attachment structure according to an embodiment of the present invention.

FIG. 14 depicts an embodiment of a frond cutting assembly 10 having a transportation assembly attachment structure 141 for cooperation with a transportation assembly, such as transportation assembly 130. In addition, this embodiment depicts one or more connection pins 145*a* and 145*b*. Structure 141 may be welded, connected, integrated or otherwise attached to frond cutting assembly 10.

Figure 15:
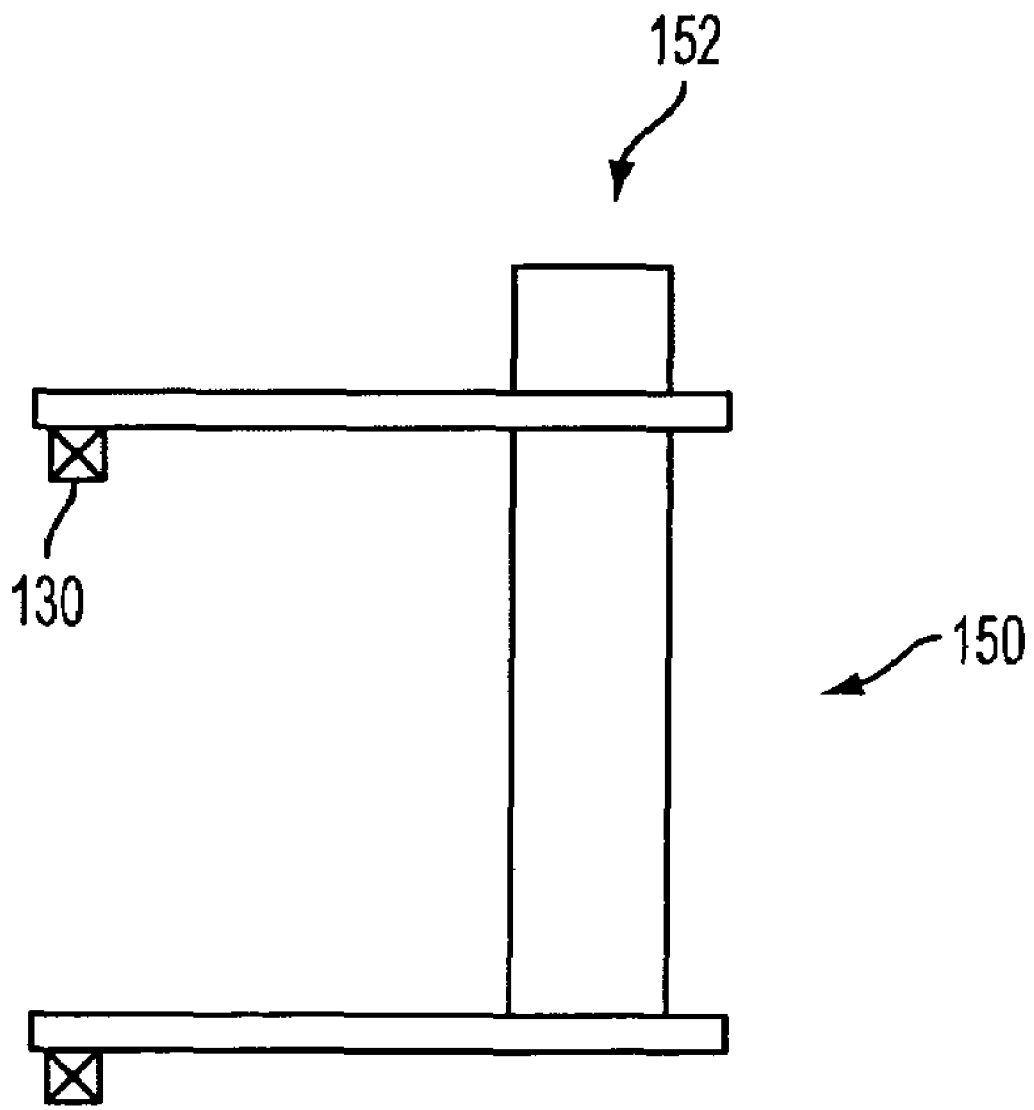
FIG. 15 depicts a partial view of a transportation assembly support structure according to an embodiment of the present invention.
Figure 18:
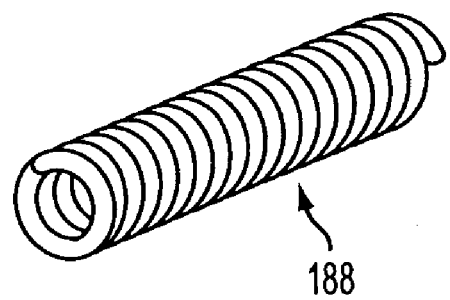
FIG. 18 depicts a bias mechanism according to an embodiment of the present invention.
Figure 19:
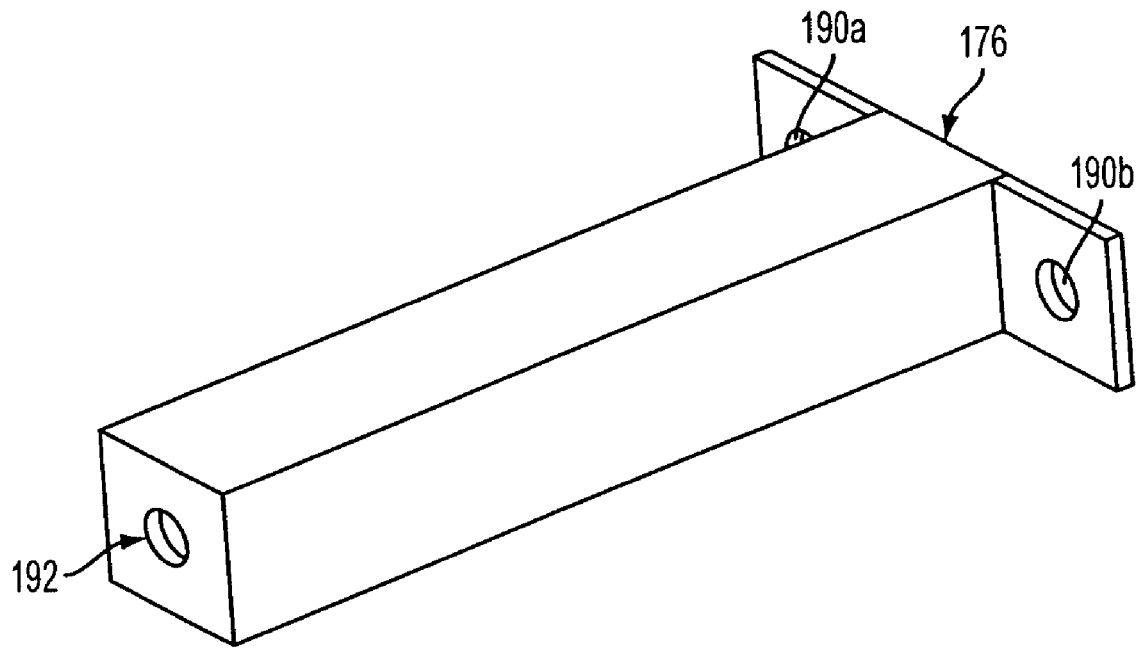
FIG. 19 depicts a housing according to an embodiment of the present invention.
Figure 20:
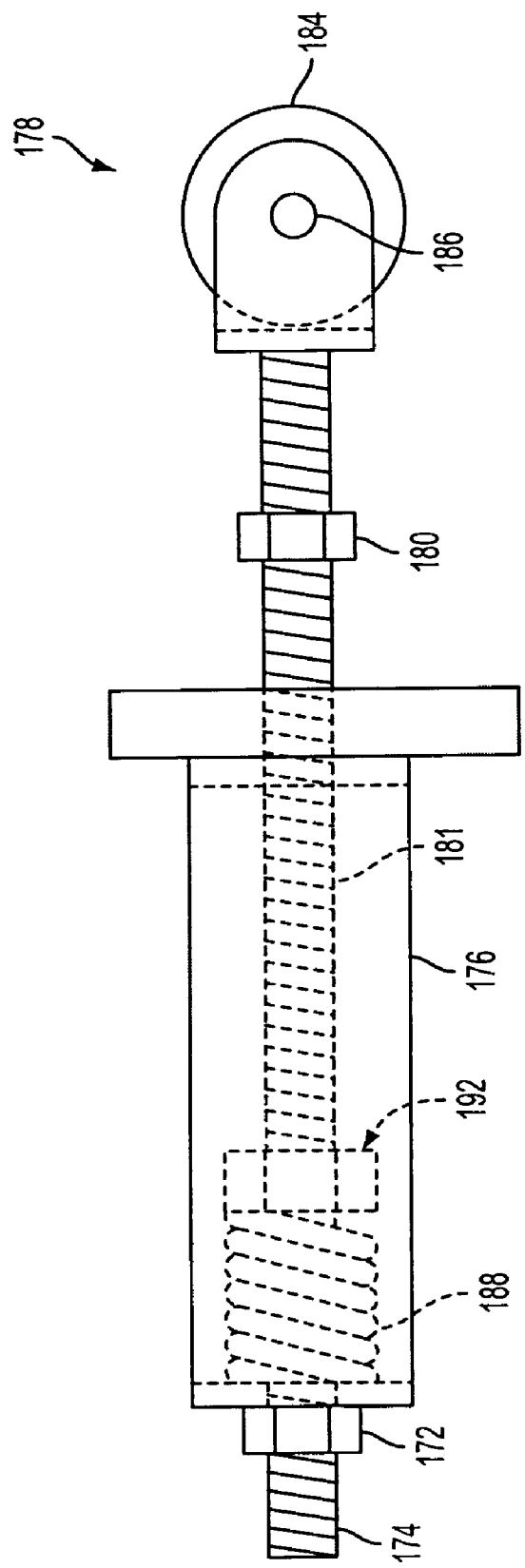
FIG. 20 depicts a side cutaway view of a roller assembly according to an embodiment of the present invention.

FIG. 15 depicts a partial view of a transportation assembly support structure 150 according to an embodiment of the present invention. Support structure 150 may comprise an opening 152 to receive a transportation assembly attachment structure 141, for example. Support structure 150 may be welded, connected, integrated or otherwise attached to transportation assembly 130.

According to various embodiments, roller assemblies may be added to anchor assembly 20 and/or cutting assembly 21. FIGS. 16-20 depict embodiments for use therewith. A roller assembly 160 may comprise a housing 176 to which a nut 172 and threaded rod 174 may be connected. A spring or other biasing structure 188 may be disposed inside housing 176. Biasing structure 188 may be pre-biased with another nut 192. Rod 174 may comprise an extended portion and/or element 181 that passes out of housing 176 to connect to the roller member 178. An adjustment nut 180 may be provided to move roller member 178 and extended element 181 into and out of housing 176. Openings 190*a*/190*b* may be provided to connect roller assembly 160 to anchor assembly 20 and/or cutting assembly 21. Roller member 178 may comprise one or more roller 184, a rod 186 and one or more nuts 182.

The size and materials used may vary within the scope of the present invention to suit the tree or other object to be trimmed. As discussed above, links of the cutting assembly and cutting assembly be comprised of aluminum and the cutting blades are made of steel. However, the apparatus may be formed from other metals, wood, or other materials. The attachment mechanisms described herein may be formed from metal, hard plastics, or other materials typically used for attachment mechanisms like bolts, screws, and the like. In addition, it should be appreciated that various iterations, modifications, substitutions and alterations to the materials and structures described are possible.

While the foregoing description includes details and specificities, it should be understood that such details and specificities have been included for the purposes of explanation only, and are not to be interpreted as limitations of the present invention. Many modifications to the embodiments described above can be made without departing from the spirit and scope of the invention, as it is intended to be encompassed by the following claims and their legal equivalents.

What is claimed is:

1. A tree trimming device comprising:

an anchor structure comprising at least one structural component and at least one clamping mechanism extending from the structural component of the anchor structure to a tree in a direction substantially perpendicular to the tree to clamp the anchor structure onto the tree through a force applied against the tree along the clamping mechanism along a substantially linear path to a point on the tree;

a cutting assembly comprising at least one structural component and at least one clamping mechanism extending from the structural component of the cutting assembly to the tree in a direction substantially perpendicular to the tree to clamp onto the tree through a force applied against the tree along the clamping mechanism along the substantially linear path to the point on the tree and at least one cutting mechanism disposed to shear limbs from a tree; and at least one extendable piston connected to the anchor structure and the cutting assembly that may operate to change the distance between the anchor structure and the cutting assembly;

wherein at least one clamping mechanism of each of the anchor structure and the cutting assembly comprises at least one horizontally mounted piston that makes contact with the tree when extended.

2. The tree trimming device of claim 1 further comprising a control system that controls the extendable piston, the anchor structure clamping mechanism and the cutting assembly clamping mechanism such that the entire apparatus climbs a tree.

3. The tree trimming device of claim 1 wherein the anchor structure comprises at least two links.

4. The tree trimming device of claim 3 wherein the anchor structure links are connected together by removable pins.

5. The tree trimming device of claim 1 wherein the cutting assembly comprises at least two links.

6. The tree trimming device of claim 5 wherein the cutting assembly links are connected together by removable pins.

7. The tree trimming device of claim 1 wherein at least one extendable piston is hydraulic and connected to a hydraulic pump and control system.

8. The tree trimming device of claim 1 wherein the cutting mechanism comprises:

a cutting blade;

and the cutting assembly further comprises a roller mechanism that makes contact with the tree to keep a substantially fixed distance between the cutting blade and the tree; and a spring mechanism to bias the roller mechanism against the tree.

9. The tree trimming system of claim 1 further comprising a safety mechanism to prevent the anchor structure cutting mechanism and the cutting assembly cutting mechanism from being unclamped from the tree at the same time.

10. The tree trimming system of claim 1 wherein the cutting mechanism comprises a cutting link with integrated blade.

11. A tree trimming device comprising:

anchor means for anchoring the device onto a tree comprising a first means for providing structure and at least one clamping means for extending from the first means to the tree in a direction substantially perpendicular to the tree to clamp the anchor means to the tree through a force applied against the tree along the clamping means along a substantially linear path to a point on the tree;

cutting support means for providing a support mechanism for a plurality of cutting means, the cutting means for shearing limbs from a tree using at least one sharpened element, the cutting support means comprising a structural means for providing structure and at least one clamping means for extending from the structural means to the tree in a direction substantially perpendicular to the tree to clamp the cutting support means to the tree though a force applied against the tree along the clamping means along the substantially linear path to the point on the tree; and extension means, operatively connected to the anchor means and cutting support means, to change a distance between the anchor means and the cutting support means and further providing force to activate the cutting means to shear limbs; and wherein at least one clamping mechanism of each of the anchor means and the cutting support means comprises at least one horizontally mounted piston that makes contact with the tree when extended.

12. The tree trimming device of claim 11 further comprising control means for controlling the extension means and anchor means such that the entire apparatus can climb a tree or other vertical member.

13. The tree trimming device of claim 11 further comprising a first clamping means associated with the cutting support means for securing and un-securing the cutting support means to a tree.

14. The tree trimming device of claim 11 wherein the cutting support means further comprises a biasing means to bias the cutting means against the tree.

15. The tree trimming device of claim 11 further comprising a second clamping means associated with the anchor means for securing and un-securing the anchor means to a tree; and safety means for preventing the first and second clamping means from un-securing the anchor means and cutting means from the tree at the same time.

16. The tree trimming system of claim 11 wherein the cutting means comprises a cutting link with integrated blade.

17. A method of shearing limbs and/or fronds from a tree comprising the acts of:

providing a tree trimming apparatus comprising an anchor structure to clamp the apparatus to a tree, a cutting assembly providing at least one cutting blade for shearing limbs from the tree and at least one extendable piston connected to the anchor structure and the cutting assembly that may operate to change the distance between the anchor structure and the cutting assembly;

clamping the anchor structure to the tree using at least one first clamp mechanism that extends substantially perpendicular to the tree to clamp the anchor structure to the tree through a force applied against the tree along the clamp mechanism along a substantially linear path to a point on the tree;

using the extendable piston, changing the distance between the anchor structure and the cutting assembly, thereby causing the cutting blade to shear one or more limbs from the tree;

clamping the cutting assembly to the tree using at least one second mechanism that extends substantially perpendicular to the tree though a force applied against the tree along the clamping mechanism along the substantially linear path to the point on the tree;

unclamping the anchor structure from the tree;

using the extendable piston, changing the distance between the anchor structure and the cutting assembly again wherein at least one clamping in mechanism of each of the anchor structure and the cutting assembly comprises at least one horizontally mounted piston that makes contact with the tree when extended.

18. The method of claim 17 further comprising the act of:

clamping the anchor structure to the tree a second time; and using the extendable piston, changing the distance between the anchor structure and the cutting assembly to thereby cause the cutting blade to shear one or more limbs from the tree again.

19. The tree trimming device of claim 1 wherein the cutting assembly cuts by shearing limbs due to a non-rotating shearing action.

20. The tree trimming device of claim 11 wherein the cutting means cuts by shearing limbs due to a non-rotating shearing action.

21. The method of claim 17 wherein the act of shearing operates using a non-rotating shearing action.

* * * * *